United States Patent
Nguyen et al.

(10) Patent No.: US 6,213,209 B1
(45) Date of Patent: Apr. 10, 2001

(54) METHODS OF PREVENTING THE PRODUCTION OF SAND WITH WELL FLUIDS

(75) Inventors: Philip D. Nguyen, Duncan; Brahmadeo T. Dewprashad, Lawton, both of OK (US); Jackie M. LaFontaine, Spring, TX (US); Jimmie D. Weaver, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/204,647

(22) Filed: Dec. 2, 1998

(51) Int. Cl.$^7$ .................................................. E21B 43/02
(52) U.S. Cl. .................... 166/276; 166/278; 166/300; 166/309
(58) Field of Search .................. 166/276, 278, 166/295, 300, 309

(56) References Cited

U.S. PATENT DOCUMENTS

| | | | |
|---|---|---|---|
| 4,072,194 | 2/1978 | Cole et al. ........................ | 166/295 |
| 4,291,766 * | 9/1981 | Davies et al. ..................... | 166/276 |
| 5,101,900 * | 4/1992 | Dees .................................. | 166/288 |
| 5,232,961 | 8/1993 | Murphey et al. ................. | 523/414 |
| 5,314,023 * | 5/1994 | Dartez et al. ..................... | 166/295 |
| 5,404,950 * | 4/1995 | Ng et al. ........................... | 166/277 |
| 5,609,207 * | 3/1997 | Dewprashad et al. ........... | 166/276 |
| 5,945,461 * | 8/1999 | Gosiewski et al. ............... | 521/123 |
| 6,006,835 * | 12/1999 | Onan et al. ....................... | 166/295 |
| 6,016,870 * | 1/2000 | Dewprashad et al. ........... | 166/295 |
| 6,068,055 * | 5/2000 | Chatterji et al. ................. | 166/293 |

* cited by examiner

*Primary Examiner*—David Bagnell
*Assistant Examiner*—Jennifer R. Dougherty
(74) *Attorney, Agent, or Firm*—Robert A. Kent; C. Clark Dougherty, Jr.

(57) ABSTRACT

Methods of preventing the production of sand with fluids produced from a subterranean formation penetrated by a well bore are provided. The methods basically comprise the steps of preparing a resin composition which delayedly forms a hardened open cell foam capable of allowing the passage of well fluids therethrough while screening and preventing the passage of formation sand and then placing the resin composition adjacent to the formation by way of the well bore.

20 Claims, No Drawings

METHODS OF PREVENTING THE PRODUCTION OF SAND WITH WELL FLUIDS

BACKGROUND OF THE INVENTION

1. Field of the Invention

This invention relates to improved methods of preventing the production of sand with well fluids, and more particularly, to such methods utilizing a hardened open cell foam as a sand screen.

2. Description of the Prior Art

Oil and gas wells are often completed in unconsolidated formations containing loose or incompetent sands which migrate with produced fluids. The presence of sand particles in the produced fluids is undesirable in that the particles abrade pumping and other producing equipment and generally reduce the fluid production capability of the formations. Incompetent subterranean formations include those which contain loose sands that are readily entrained by produced fluids and those wherein the sand particles making up the formations are bonded together with insufficient bond strength to withstand the forces produced by the intermittent production of fluids from the formations.

Heretofore, unconsolidated formations have been treated by creating fractures in the formations and depositing proppant material, e.g., sand of a selected size, in the fractures to maintain them in open positions. In addition, the proppant has heretofore been consolidated within the fractures into hard permeable masses to prevent it from flowing back and to reduce the migration of sand through the fractures with produced fluids. Further, costly gravel packs which include sand screens and the like have been installed in wells which serve as filters and prevent formation sand and/or proppant from migrating with produced fluids into the well bores. However, since gravel packs, sand screens and the like filter out sand, the presence of the filtered sand can add to the flow resistance thereby producing additional pressure draw down which causes the fracture faces and other portions of the formation to break down and consolidated proppant and sand in fractures, gravel packs and the like to be bypassed.

In horizontal well bores formed in unconsolidated formations, the well bores are often completed open hole and a slotted liner, sand control screen, gravel pack or the like is installed in the well bore. Again, however, as the incompetent formation breaks down from being produced, the slotted liner, sand control screen or gravel pack is often bypassed whereby formation sand is produced along with formation fluids. Thus, there is a need for improved methods of completing unconsolidated producing formations whereby sand production with produced fluids is prevented.

SUMMARY OF THE INVENTION

The present invention provides improved unconsolidated formation completion methods which meet the needs described above and overcome the deficiencies of the prior art. The methods basically comprise the steps of preparing a resin composition which delayedly forms a hardened open cell foam capable of allowing the passage of well fluids therethrough while screening and preventing the passage of formation sand. After being prepared, the resin composition is placed adjacent to a subterranean producing formation whereby it forms a hardened open cell foam in the formation which prevents the production of sand. The hardened open cell foam has high strength and will not break down as a result of forces produced by the intermittent production of fluids from the formation, etc.

The resin compositions useful in accordance with the present invention are comprised of a hardenable polyepoxide resin, one or more substantially water immiscible diluents present in the resin composition in amounts sufficient to lower the viscosity thereof to a desired level, a delayed hardening agent for the polyepoxide resin, a filler which reacts with an activator to form a gas and a delayed gas generating activator. In addition, a surfactant for controlling the size of the open cells formed in the epoxy resin foam is preferably included in the resin composition. The surfactant also aids in the formation of the foam and its stabilization during the hardening process.

It is, therefore, a general object of the present invention to provide improved methods of preventing the production of sand with well fluids.

Other and further objects, features and advantages of the present invention will be readily apparent to those skilled in the art upon a reading of the description of preferred embodiments which follows.

DESCRIPTION OF PREFERRED EMBODIMENTS

The present invention provides improved methods of preventing the production of sand with fluids produced from subterranean formations. The sand prevented from being produced can be proppant previously injected into a subterranean formation as part of a fracture stimulation treatment which is flowing back with produced fluids or migrating loose and incompetent formation sand, or both.

The methods of this invention basically comprises the steps of preparing a resin composition which delayedly forms a hardened open cell foam capable of allowing the passage of well fluids therethrough while screening and preventing the passage of formation sand, and then placing the resin composition adjacent to a subterranean formation by way of a well bore penetrating the formation. Generally, the open cell foam forming resin composition is placed in the annulus between a slotted liner, sand control screen or the like and the walls of the well bore penetrating an incompetent subterranean formation.

The resin compositions which are suitable for use in accordance with this invention are basically comprised of a hardenable polyepoxide resin diluted with one or more substantially water immiscible diluents to lower the viscosity of the resin to a desired level. The resin compositions also contain a delayed hardening agent for the polyepoxide resin, a filler which reacts with an activator to form a gas and a delayed gas generating activator. In addition, the resin compositions preferably include a surfactant which facilitates the formation of a foam, controls the size of the open cells formed in the foam whereby they function to screen sand and stabilizes the foam formed while the resin compositions harden.

While various polyepoxide resins can be utilized in the above described resin compositions, preferred such resins are the condensation products of epichlorohydrin and hydroxy compounds such as resorcinol, hydroquinone, glycerine, pentaerythritol, 1,4-butandiol, phloroglucinol, bisphenol A and bisphenol F. The most preferred resins are the condensation resin products of epichlorohydrin and bisphenol A. A commercially available such product is marketed by the Shell Chemical Company of Houston, Tex. under the trade name "EPON 828®". This resin exhibits good temperature stability and chemical resistance, and has a viscosity of about 15,000 centipoises.

The one or more substantially water immiscible diluents utilized in the resin compositions of this invention are present therein in amounts sufficient to adjust the viscosity of the compositions to a desired level, generally a level in the range of from about 100 centipoises to about 800 centipoises. Preferably, two substantially water immiscible diluents are included in the resin compositions, one being reactive with the epoxy resin component and the other being non-reactive therewith.

The substantially water immiscible reactive diluent is preferably comprised of at least one member selected from the group of butyl glycidyl ether, cresol glycidyl ether, allyl glycidyl ether, phenyl glycidyl ether, butyl diglycidyl ether, resorcinol diglycidyl ether and other glycidyl ethers which are miscible with the epoxy resin utilized. Of these, butyl glycidyl ether and cresol glycidyl ether are the most preferred.

The reactive diluent or diluents are generally present in the resin compositions in an amount in the range of from about 2% to about 35% by weight of the polyepoxide resin in the compositions. Preferably, the reactive diluent is present in the range of from about 15% to about 30%, and most preferably, about 28% by weight of the polyepoxide resin.

The substantially water immiscible non-reactive diluent is preferably at least one member selected from the group of ethyl acetate, butyl lactate, ethyl lactate, amyl acetate, ethylene glycol diacetate and propylene glycol diacetate. Of these, butyl lactate and ethyl acetate are preferred with butyl lactate being the most preferred.

The substantially water immiscible non-reactive diluent is generally present in the resin compositions in an amount in the range of from about 4% to about 20% by weight of the polyepoxide resin therein. Preferably the non-reactive diluent is present in an amount in the range of from about 8% to about 15%, and most preferably, about 10% by weight of the polyepoxide resin in the resin compositions.

The delayed hardening agent for the polyepoxide resin is preferably comprised of the adduct formed by reacting an aliphatic amine with the condensation reaction product of epichlorohydrin and bisphenol A. Such adducts are described in detail in U.S. Pat. No. 5,232,961 issued to Murphey, et al. on Aug. 3, 1993 which is incorporated herein by reference. While a variety of aliphatic amines can be utilized in forming the adduct, preferred amines are those selected from the group consisting of ethylene diamine, triethylene tetramine, tetraethylene pentamine, bis-(p-aminocyclohexyl) methane, the diamines and triamines of cyclopentane and the diamines and triamines of cyclohexane, e.g., 1,2-diamino cyclohexane and 1,4-diamino cyclohexane. Of these, triethylene tetramine, 1,2-diamino cyclohexane and 1,4-diamino cyclohexane are more preferred with 1,4-diamino cyclohexane being the most preferred.

The delayed hardening agent is generally present in the resin compositions in an amount in the range of from about 20% to about 150% by weight of the polyepoxide resin therein. Preferably, the hardening agent is present in an amount in the range of from about 40% to about 90%, and most preferably, about 68% by weight of the polyepoxide resin in the resin compositions.

The gas forming fillers which can be included in the resin compositions of this invention and which react with an activator to form a gas include, but are not limited to, sodium bicarbonate, azodicarbonamine, 5-phenyltetrazole, dinitrosopentamethylene-tetramine, sulfonyl hydrazine and sulfonyl semicarbazide. Of these, sodium bicarbonate is the most preferred.

The filler is preferably included in the resin compositions of this invention in an amount in the range of from about 1% to about $_{13}$ 25% by weight of the polyepoxide resin therein. Most preferably, the filler is present in the resin composition in an amount of about 5% by weight of the epoxy resin therein.

The delayed gas generating activator in the resin compositions delayedly reacts with the filler to form a gas, e.g., carbon dioxide. The gas in turn causes the resin compositions to be converted into open cell foams which upon hardening allow the passage of well fluids therethrough while screening and preventing the passage of formation sand. While various delayed gas generating activators can be utilized in the resin compositions of this invention, preferred such activators include citric acid, ascorbic acid, maleic acid, oxalic acid, salicylic acid and esters of such acids. Of these, citric acid is the most preferred.

The delayed gas generating activator is preferably present in the resin compositions in an amount in the range of from about 1% to about 25% by weight of the polyepoxide resin therein. Most preferably, the gas generating activator is present in the resin compositions in an amount of about 5% by weight of the polyepoxide resin therein.

In order to facilitate the formation of a stable foam having open cells and to ensure the open cells are of a uniform small size which function to screen sand particles, the resin compositions preferably include a surfactant. Examples of surfactants which can be utilized include, but are not limited to, nonionic surfactants such as long chain carboxylic esters, e.g., propylene glycol esters, sorbitol esters and polyoxyethylenated sorbitol esters, polyoxyethylenated alkylphenols, alkyphenols, ethoxylates, alkylglycosides, alkanolamine condensates and alkanolamides; anionic surfactants such as carboxylic acid salts, sulfonic acid salts, sulfuric ester salts, phosphonic acid esters and polyphosphoric acid esters; and cationic surfactants such as long chain amines and their salts, quaternary ammonium salts, polyoxyethylenated long chain amines, quaternized polyoxyethylenated long chain amines, and zwitterionics such as n-alkylbetaines. Of these, nonionic long chain carboxylic esters are preferred.

The surfactant is generally included in the resin compositions in an amount in the range of from about 0.01% to about 5% by weight of polyepoxide resin therein. Most preferably, the surfactant is present in an amount of about 0.1%. However, in order to confirm that a particular surfactant in a particular amount will aid in the formation of and stabilize an open cell foam capable of screening sand from fluids produced from a subterranean formation, one or more laboratory tests wherein hardened open cell foams are formed under conditions duplicating the formation conditions can be conducted prior to carrying out the methods of the present invention.

As mentioned above, a resin composition of the present invention which delayedly forms a hardened open cell foam in a subterranean formation to prevent the production of sand with well fluids is prepared on the surface and then pumped and/or displaced into the subterranean formation and/or into perforations therein by way of a well bore penetrating the formation. The methods of this invention are particularly suitable for preventing sand production in wells completed in unconsolidated formations wherein slotted liners, sand control screens and gravel packs have heretofore been utilized. In accordance with the methods of the present invention, a resin composition which delayedly forms a hardened open cell foam is pumped and/or displaced into a subterranean formation penetrated by a well bore which contains a slotted liner, a sand control screen or the like therein. The slotted liner or sand control screen forms an annulus adjacent to the walls of the well bore. The resin composition is caused to flow into the annulus, and after being placed therein the resin composition forms a hardened open cell foam of high rigidity and strength which maintains the slotted liner or sand control screen in place and prevents the production of sand with fluids produced from the formation. Prior to hardening, the resin composition fills the annulus without the formation of voids, and upon foaming and hardening, prevents the slotted liner or sand screen from being bypassed.

In order to prevent fluid loss from a resin composition of this invention while it is being placed in a subterranean formation, a fluid loss control additive can be included in the composition. Preferably, the fluid loss control additive is a particulate material that can be dissolved from the hardened open cell foamed resin after it is formed in a subterranean formation. Examples of such particulate fluid loss control additives include cross-linked hydroxyethylcellulose dissolvable by acids, resin beads dissolvable by crude oil, and rock salt dissolvable by water. Of these, hydroxyethylcellulose is the most preferred and is generally included in the resin composition in an amount in the range of from about 1% to about 25% by weight of the composition, preferably about 5%. Other additives known to those skilled in the art such as resin hardening retarders or accelerators can also be included in the resin composition.

The most preferred method of the present invention for preventing the production of sand with fluids produced from a subterranean formation penetrated by a well is as follows. A pumpable resin composition is prepared which delayedly forms a hardened open cell foam capable of allowing the passage of well fluids therethrough while screening and preventing the passage of formation sand. The resin composition is comprised of a hardenable epichlorohydrin and bisphenol A condensate epoxy resin, a substantially water immiscible reactive butyl glycidyl ether diluent present in an amount of about 28% by weight of epoxy resin in the composition and a substantially water immiscible non-reactive butyl lactate diluent present in an amount of about 10% by weight of epoxy resin in the composition. Also included in the resin composition are a delayed hardening agent comprised of the adduct formed by reacting 1,4-diamino cyclohexane with the condensation reaction product of epichlorohydrin and bisphenol A present in an amount of about 68% by weight of epoxy resin in the composition, a filler comprised of sodium bicarbonate present in an amount of about 5% by weight of epoxy resin in the composition, a surfactant comprised of a nonionic long chain carboxylic ester present in an amount of about 0.1% by weight of epoxy resin in the composition and a delayed gas generating activator comprised of citric acid present in an amount of about 5% by weight of epoxy resin in the composition. After being prepared, the resin composition is pumped and/or displaced into the subterranean formation by way of the well bore.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of preventing the production of sand with fluids produced from a subterranean formation penetrated by a well bore comprising the steps of:

(a) preparing a resin composition which delayedly forms a hardened open cell foam capable of allowing the passage of well fluids therethrough while screening and preventing the passage of formation sand, said resin composition being comprised of a hardenable polyepoxide resin, one or more substantially water immiscible diluents present in said resin composition in amounts sufficient to lower the viscosity thereof to a desired level wherein said diluents include a reactive diluent selected from the group consisting of butyl glycidyl ether, cresol glycidyl ether, allyl glycidyl ether, phenyl glycidyl ether, butyl diglycidyl ether, resorcinol diglycidyl ether and mixtures of two or more of such diluents or a non-reactive diluent selected from the group consisting of ethyl acetate, butyl lactate, ethyl lactate, amyl acetate, ethylene glycol diacetate, propylene glycol diacetate and mixtures of such diluents, a delayed hardening agent for said polyepoxide resin, a filler which reacts with an activator to form a gas and a delayed gas generating activator; and (b) placing said resin composition adjacent to said formation by way of said well bore.

2. The method of claim 1 wherein said resin composition further comprises a surfactant.

3. The method of claim 2 wherein said surfactant is selected from the group consisting of nonionic long chain carboxylic esters, polyoxyethylenated alkylphenols, alkyphenols, ethoxylates, alkylglycosides, alkanolamine condensates and alkanolamides; anionic carboxylic acid salts, sulfonic acid salts, sulfuric ester salts, phosphonic acid esters and polyphosphonic acid esters; and cationic polyoxyethylenated long chain amines, quaternized polyoxyethylenated long chain amines and zwitterionics such as n-alkylbetaines.

4. The method of claim 3 wherein said surfactant is present in said epoxy resin composition in an amount in the range of from about 0.01% to about 5% by weight of said polyepoxide resin therein.

5. The method of claim 1 wherein said polyepoxide resin in said resin composition is comprised of the condensation reaction product of epichlorohydrin and bisphenol A.

6. The method of claim 1 wherein said reactive diluent is present in said resin composition in an amount in the range of from about 5% to about 30% by weight of said polyepoxide resin therein.

7. The method of claim 1 wherein said non-reactive diluent is present in said resin composition in an amount in the range of from about 4% to about 20% by weight of said polyepoxide resin therein.

8. The method of claim 1 wherein said delayed hardening agent in said resin composition is comprised of the adduct formed by reacting an aliphatic amine with the condensation reaction product of epichlorohydrin and bisphenol A.

9. The method of claim 8 wherein said delayed hardening agent is present in said resin composition in an amount in the range of from about 20% to about 150% by weight of said polyepoxide resin therein.

10. The method of claim 1 wherein said filler in said resin composition is selected from the group consisting of sodium bicarbonate, azodicarbonamine, 5-phenyltetrazole, dinitrosopentamethylene-tetramine, sulfonyl hydrazine and sulfonyl semicarbazide.

11. The method of claim 10 wherein said filler is present in said resin composition in an amount in the range of from about 1% to about 25% by weight of said polyepoxide resin therein.

12. The method of claim 1 wherein said delayed gas generating activator in said resin composition is selected from the group of citric acid, ascorbic acid, maleic acid, oxalic acid, salicylic acid and esters of such acids.

13. The method of claim 12 wherein said delayed gas generating activator is present in said resin composition in an amount in the range of from about 1% to about 25% by weight of said polyepoxide resin therein.

14. The method of claim 1 wherein said resin composition further comprises a fluid loss control additive.

15. The method of claim 14 wherein said fluid loss control additive is hydroxyethylcellulose present in said composition in an amount in the range of from about 1% to about 25% by weight of said polyepoxide resin therein.

16. A method of preventing the production of sand with fluids produced from a subterranean formation penetrated by a well bore which contains a slotted liner or a sand control screen forming an annulus therein comprising the steps of:

(a) preparing a pumpable resin composition which delayedly forms a hardened open cell foam capable of allowing the passage of well fluids therethrough while screening and preventing the passage of formation sand, said resin composition being comprised of a hardenable epichlorohydrin and bisphenol A condensate epoxy resin, a substantially water immiscible reactive diluent selected from the group consisting of butyl glycidyl ether and cresol glycidyl ether present in said resin composition in an amount in the range of from about 15% to about 30% by weight of said epoxy resin therein, a substantially water immiscible non-reactive diluent selected from the group of butyl lactate and ethyl acetate present in said resin composition in an amount in the range of from about 8% to about 15% by weight of said epoxy resin therein, a delayed epoxy resin hardening agent comprised of the adduct formed by reacting an amine selected from the group consisting of triethylene tetramine, 1,2-diamino cyclohexane and 1,4-diamino cyclohexane with the condensation reaction product of epichlorohydrin and bisphenol A present in said resin composition in an amount in the range of from about 40% to about 90% by weight of said epoxy resin therein, a filler selected from the group consisting of sodium bicarbonate and azodicarbonamine present in said resin composition in an amount in the range of from about 1% to about 25% by weight of epoxy resin therein, a surfactant selected from the group consisting of long chain carboxylic esters present in said resin composition in an amount in the range of from about 0.01% to about 5% by weight of epoxy resin therein and a delayed gas generating activator selected from the group of citric acid and ascorbic acid present in said resin composition in an amount in the range of from about 1% to about 25% by weight of said epoxy resin therein; and (b) pumping said resin composition into said annulus.

17. The method of claim 16 wherein said amine in said adduct hardening agent is 1,4-diamino cyclohexane and said hardening agent is present in said resin composition in an amount of about 68% by weight of said epoxy resin therein.

18. The method of claim 17 wherein said filler is sodium bicarbonate and is present in said resin composition in an amount of about 5% by weight of said epoxy resin therein.

19. The method of claim 18 wherein said gas generating activator is citric acid and is present in said resin composition in an amount of about 5% by weight of said epoxy resin therein.

20. A method of preventing the production of sand with fluids produced from a subterranean formation penetrated by a well bore comprising the steps of:

(a) preparing a pumpable resin composition which delayedly forms a hardened open cell foam capable of allowing the passage of well fluids therethrough while screening and preventing the passage of formation sand, said resin composition being comprised of a hardenable epichlorohydrin and bisphenol A condensate epoxy resin, a substantially water immiscible reactive butyl glycidyl ether diluent present in an amount of about 28% by weight of epoxy resin in said composition, a substantially water immiscible non-reactive butyl lactate diluent present in an amount of about 10% by weight of epoxy resin in said composition, a delayed hardening agent comprised of the adduct formed by reacting 1,4-diamino cyclohexane with the condensation reaction product of epichlorohydrin and bisphenol A present in an amount of about 68% by weight of epoxy resin in said composition, a filler comprised of sodium bicarbonate present in an amount of about 5% by weight of epoxy resin in said composition, a surfactant comprised of a propylene glycol ester present in an amount of about 0.1% by to weight of epoxy resin in said composition, a delayed gas generating activator comprised of citric acid present in an amount of about 5% by weight of epoxy resin in said composition and a fluid loss control additive comprised of hydroxyethylcellulose present in an amount of about 5% by weight of epoxy resin in said composition; and (b) pumping said resin composition into said formation by way of said well bore.

\* \* \* \* \*